J. W. HALL.
BUNDLE TYING MACHINE.
APPLICATION FILED OCT. 16, 1908.

912,470.

Patented Feb. 16, 1909.
9 SHEETS—SHEET 2.

Witnesses
Daniel Webster Jr.
P. M. Kelly

Inventor
Jesse W. Hall
By
Attorney

J. W. HALL.
BUNDLE TYING MACHINE.
APPLICATION FILED OCT. 16, 1908.

912,470.

Patented Feb. 16, 1909.
9 SHEETS—SHEET 4.

Witnesses
Daniel Webster Jr.
A. M. Kelly

Inventor
Jesse W. Hall
By
Attorney

UNITED STATES PATENT OFFICE.

JESSE W. HALL, OF WRIGHTSTOWN, PENNSYLVANIA.

BUNDLE-TYING MACHINE.

No. 912,470.

Specification of Letters Patent.

Patented Feb. 16, 1909.

Application filed October 16, 1908. Serial No. 458,004.

*To all whom it may concern:*

Be it known that I, JESSE W. HALL, a citizen of the United States, and resident of Wrightstown, county of Bucks, State of Pennsylvania, have invented an Improvement in Bundle-Tying Machines, of which the following is a specification.

My invention has reference to bundle tying machines, and consists of certain improvements which are fully set forth in the following specification and shown in the accompanying drawings which form a part thereof.

The object of my invention is to provide a machine which will automatically apply a string around a bundle and tie the same, and which shall be adapted for tying bundles of various sizes and shapes.

My invention consists in two cord carriers adapted to be moved to or from each other and also be capable of being simultaneously moved to and from a bundle support and combined with a knot-tying device adapted to tie the cord guided by the two cord guides, whereby the cords may be moved relatively to the bundle support and bundle so that by manipulating the bundle the cords will be wrapped about the same and then tied together.

My invention also comprehends in a machine of the character above specified the employment of a double knot-tier, which shall tie two knots upon the cords from the two cord-guides so as to unite them in two places, and sever the cords between the knots, whereby one knot is tied close to the bundle and released, and the other knot ties the new ends of the two cords and by which they are connected between the cord-guides, and adapted to receive a new bundle preliminary to the tying operation.

My invention also comprehends many features of construction designed for producing different movements in the cord-guides, and in the operation of the knot-tier, and these various features of construction fully described hereinafter, and more particularly referred to in the claims.

My invention will be better understood by reference to the drawings, in which.

The general operation of the machine is as follows:—The ends of the cords from two spools are tied together, and the cord-guides of each side of the knot are spread apart and lowered to a bundle table. The bundle which has been properly wrapped is then laid across the knot portion of the cords, and below the cord-guides, the latter being in raised position and above the bundle. The cord-guides are then oscillated so that the guide ends are made to cross, and in this manner cross the cords. The bundle is then rotated horizontally a quarter revolution, and reversed so as to bring the cords upward over the end knots previously tied and the cord-guides then move toward each other and upward so as to bring the cords into the knot-tier. The cords are then tied by manipulation of the knot-tier close to the bundle and at a distance somewhat above it, and severed between the two knots. The bundle is then free and firmly tied and the cords from the two cord-guides will have been tied together, and in condition to receive the next bundle upon the descent of cord-guide to the wrapping table. At the time of crossing the cords, it is necessary that said cords shall clear the knot tier and to accomplish this result, the cord guides are shifted forward preliminary to their operation of crossing each other, so that when the crossing takes place, it is accomplished in planes in front of the knot tier. After the bundle has been manipulated to bring the cords about it in the proper manner, these cord guides are moved back to their original positions while still in their forward adjustment so that the cords remain clear of the knot tier if additional binding by hand is required. If the wrapping has been sufficient for strength, the cord guides may then be shifted backward to their original positions, whereby further manipulation thereof will bring the cords within the knot tier and permit the same to tie the knot.

Referring now to the various constructions employed in the make up of my improved machine, 2 is the main frame and consists essentially of two upright hollow side frames 3 supported by a hollow base 4 the upper surface 5 of which constitutes the wrapping table.

Figure 6:
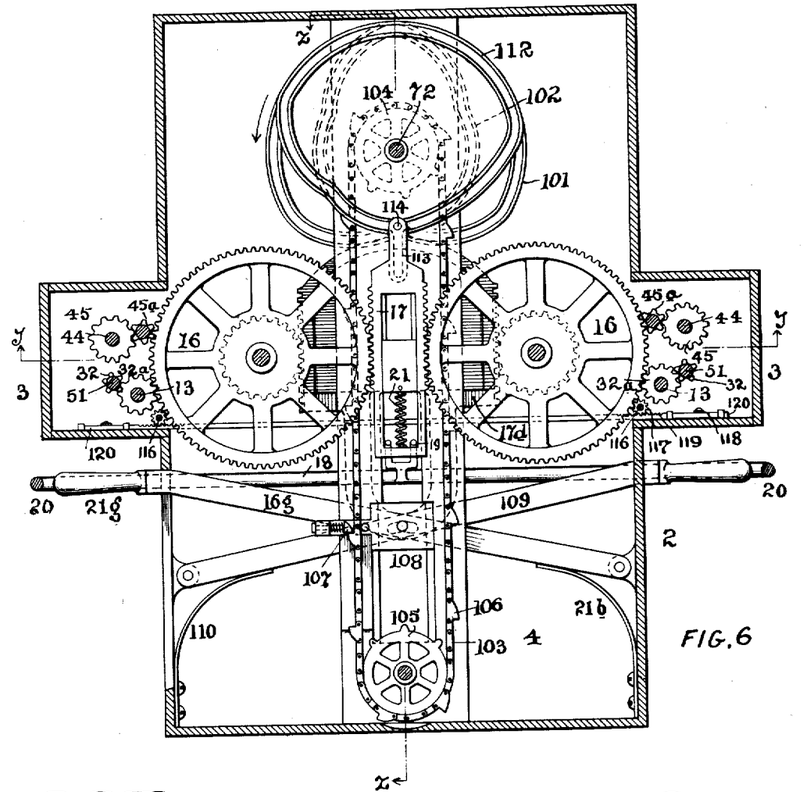
Fig. 6 is a plan view at the base of the machine illustrating part of the operating mechanism of the apparatus.
Figure 7:
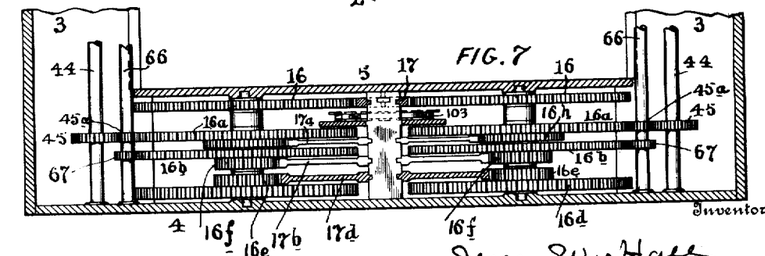
Fig. 7 is a sectional elevation taken on line $y$—$y$ of Fig. 6.
Figure 8:
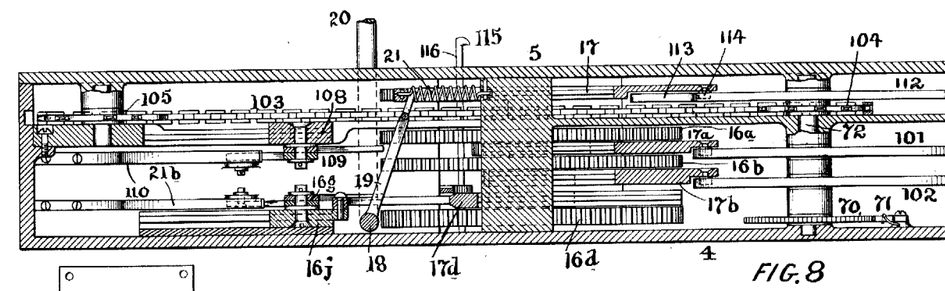
Fig. 8 is a sectional elevation of Fig. 6 on line $z$—$z$.
Figure 9:
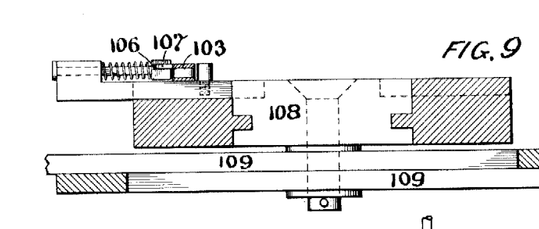
Figs. 9 and 10 are sectional views of the portion of the apparatus shown in Fig. 6.

6 is a vertically movable frame guided upon vertical rods 7 of the main frame and carrying the pivoted cord guides 8 by which the cord is guided from the cord bobbins 9 to the bundle and knot tier 10, which latter is also carried by the frame 6. The frame 6 is provided with racks 11 on each side. Meshing with the racks 11 are worms 12 which latter are adapted to be rotated by shafts 13 so that by the rotation of said worms the frame 6, together with its cord guides, may be vertically adjusted. The worm shafts 13 are rotated by gearing 15$^a$ driven by large gears 16$^d$ having pinions 16$^e$, which in turn mesh with a sliding rack frame 17$^d$ which receives motion by means of a slide 16$^j$ and lever 16$^g$ extending to the outside of the machine having a handle 21$^g$, by which it may be moved. By pulling the handle 21$^g$ outward, the rotation of the worm shaft is such that the frame 6 is caused to descend. By releasing the handles, the spring 21$^b$ moves the rack frame 17$^d$ back into the position indicated in Fig. 6 and returns the frame 6 to its upper and normal position. In this manner, the knot tier and the cord guides are enabled to have a vertical movement, together with the frame 6, and relative to the wrapping table 5.

The two cord guides 8 are pivoted at 46 near together at the top of the frame 6 and consist essentially of a swinging frame having an extensible tubular cord guide end which is automatically extended or retracted independently of the swinging of the main part of the said cord guide. Referring to the construction of these cord guides, 22 is the main pivoted or swinging part and guided upon it is an extensible tubular part 23 which is connected by a telescopic radius bar 24 with a pivot 25 on a second telescopic radius bar 26 which, in turn, is provided with a slotted end 27 making a pivoted connection with a pin 28 upon the frame 6. This last mentioned telescopic radius bar 26 (see Fig. 12) consists of two parts 29 and 30 the latter containing a spring 31$^a$ tending to keep the radius bar extended. The part 29 thereof is pivoted to the swinging part 22 of the cord guide.

Figure 3:
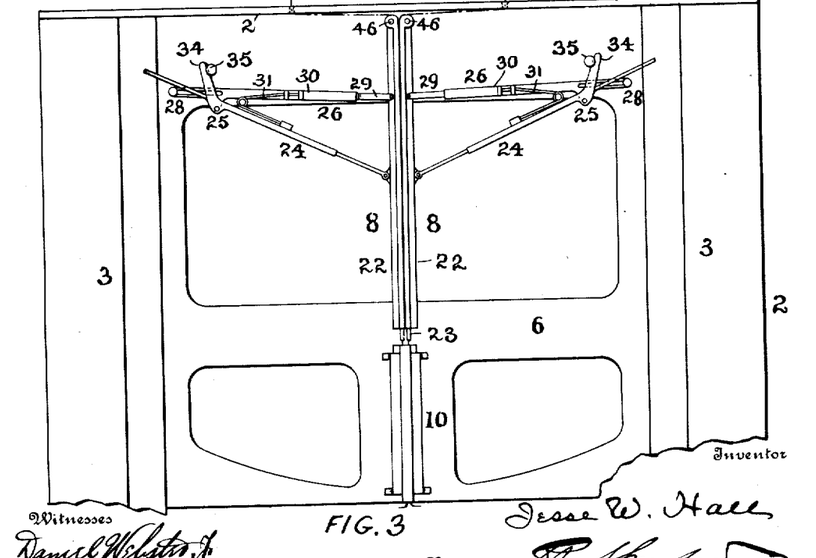
Figure 4:
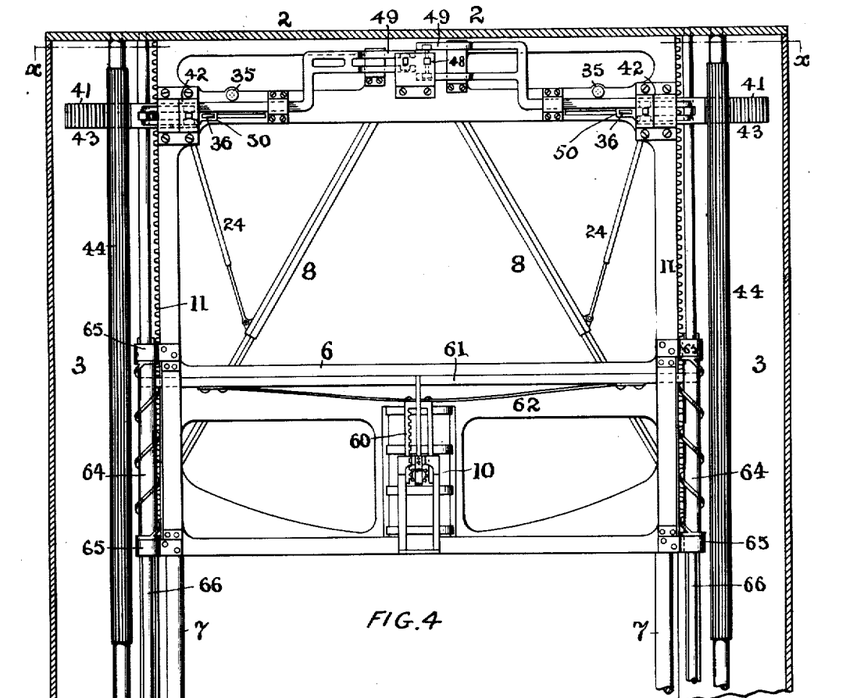
Fig. 4 is a sectional elevation of the structure illustrated in Fig. 1, but looking at it from the rear.
Figure 5:
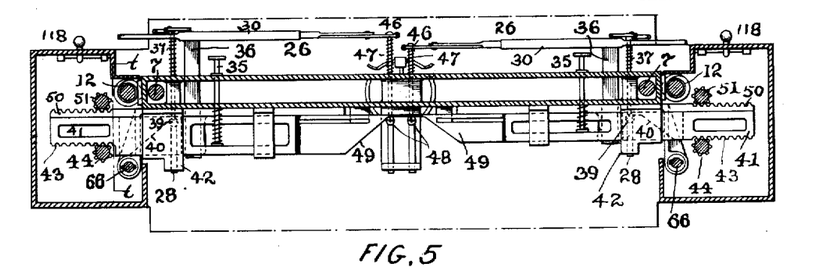
Fig. 5 is a sectional plan view taken on line $x$—$x$ Fig. 4.

31 is a spring which connects the two radius bars so as to tend to move them into alinement by throwing their ends apart and in that way extending the tubular end 23 of the cord guide upon the pivoted swinging part 22. The pivoted radius bar 24 is provided with a lever extension 34 which, when the cord guides are moved toward each other as indicated in Fig. 3, strikes the stop 35 and thereby oscillates the said radius bar so as to raise or retract the tubular end of the cord guide into a position to have its end come just above the knot tier, as indicated in Fig. 3. When this operation takes place, the spring 31 is compressed, and when the radius bar 26 is moved outward again, the said spring 31 spreads the radius bars into the position indicated in Fig. 1 and thereby extends the end of the tubular guide. The part 30 of the radius bar 26 is carried upon a guide 36 (Fig. 5) and is spring pressed outwardly by a coil spring 37. The pivot 28, upon which the slotted end of the radius bar 26 is pivoted, supports the coil spring last mentioned and said pivot pin extends through the adjustable frame 6 and is provided with a roller 39 which is acted upon by a cam 40 on a sliding frame 41, said sliding frame being guided at 42 upon the rear of the vertically adjusted frame 6 and being operated by means of a rack 43 meshing with a vertical pinion 44 of great length. The pinion 44 extends substantially from top to bottom of the machine and is adapted to be rotated by gears 45 and 45$^a$, the latter of which meshes with the large gear 16$^a$ in the base. By the rotation of the pinion 44 the cam 40 may be moved inward so as to draw the radius bars backward toward the frame 6 when it is desired that the knot tier shall operate upon the cords. As it is also necessary that the cord guides shall be similarly adjusted with the radius bars, I provide similar spring actuated pins 46 for the pivots of the cord guides and these pins are spring actuated outwardly by coil springs 47 and are moved backward by rollers 48 operated by cams 49. These latter cams are operated by the bar 41 and simultaneously with the cams 40. The guides 36 are carried by a reciprocating rack bar 50 which is operated by the long pinion 51 driven by gears 32 and 32ª from the large gear 16 in the base of the case.

The gear 45ª is an idler by which pinions 45 and 44 are driven from gear 16ª, this latter being operated by a pinion 16ᵇ and reciprocating rack 17ª actuated by a cam 101 on the cam shaft 72. The gears 32ª are idlers on shafts 13 by which the pinions 32 and 51 are driven from gears 16, these latter being operated by a reciprocating rack 17 actuated by a cam 112 on the cam shaft 72.

The cam shaft 72 is intermittently rotated by a sprocket chain 103 and sprocket wheels 104 secured to the shaft and also guided by sprocket wheel 105 operating as an idler. The chain 103 has teeth 106 and these are engaged by a spring tooth 107 carried by a reciprocating frame 108, said frame being reciprocated by either of two pivoted levers 109 extending to the outside of the case and terminating in handles at the right and left sides of the machine. A spring 110 returns the lever and the slide to normal position after each reciprocation. The cam 112 is so shaped that it will during only a portion of the revolution of the shaft 72 operate the rack 17ᵇ to reciprocate the rack bar 50, said parts remaining stationary at other times. The cam 101 on the cam shaft, under a rotation of said shaft due to the reciprocation of the lever 109, will operate a rack 17ª to rotate gears 16ª for operating the idler gears 45ª and gear 45, the result of which is to operate rack bars 41 having the cams 40 and 49. The cam 102 on the cam shaft 72 operates the rack 17ᵇ and by it the gears 16ᵇ which, through the pinions 67 operates shafts 66 and worms 64 for operating the knot tier devices. The cam 112 has a radial slot 113 which permits the pin 114 of the rack 17 having free movement so that the rack 17 may be moved by the rock shaft 18 when the cams are stationary and in position shown in Fig. 6. By these devices, the cord guides as a whole are moved forward and backward independently of their oscillation and when forward may cross without delivering the cord to the knot tier; but in their rearward position, they cannot pass the knot tier as they are then adjusted to deliver the cord directly thereto, as indicated in Fig. 3.

Figure 10:
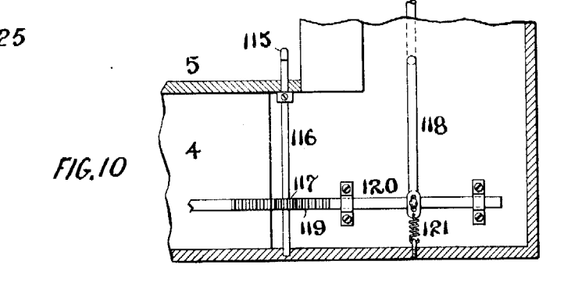

The base of the machine is provided with two hooks 115 carried by vertical shafts 116 having pinions 117. The pins are rotated by racks 119 on a bar 120 which may be reciprocated by either of the two hand levers 118. Springs 121 holds the levers 118 vertical (Fig. 10) and the hooks in retaining position.

A ratchet wheel 70 is secured to the cam shaft 72 and a pawl 71 prevents said ratchet wheel and shaft from rotating backward.

Figure 1:
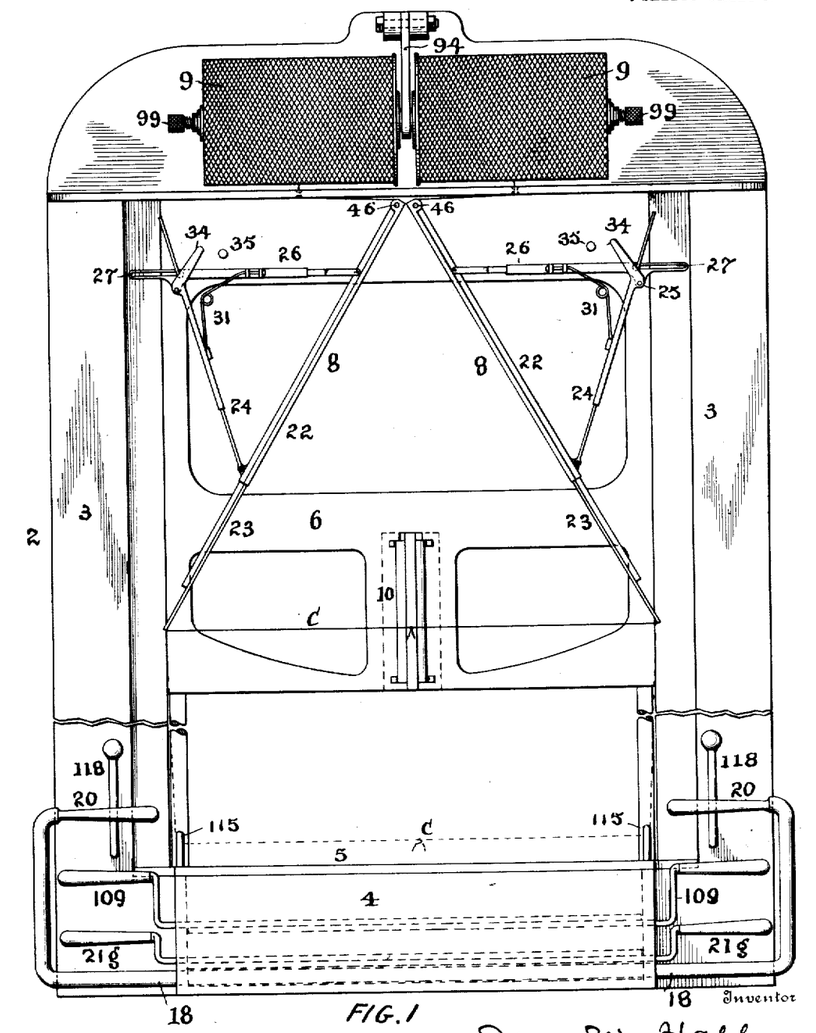
Figure 1 is a front elevation of a bundle tying machine embodying my invention.
Figure 16:
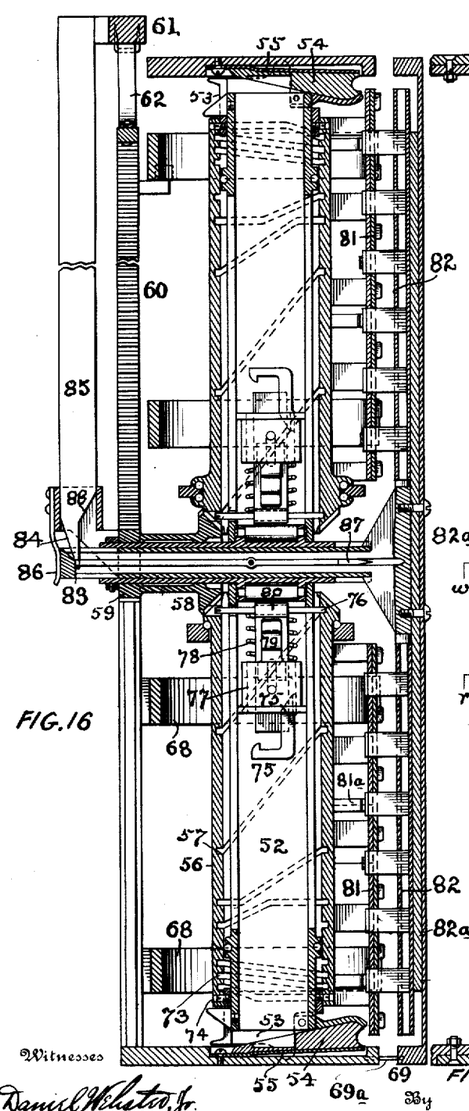
Figs. 16 and 17 are sectional elevations through the knot-tying devices.
Figure 17:
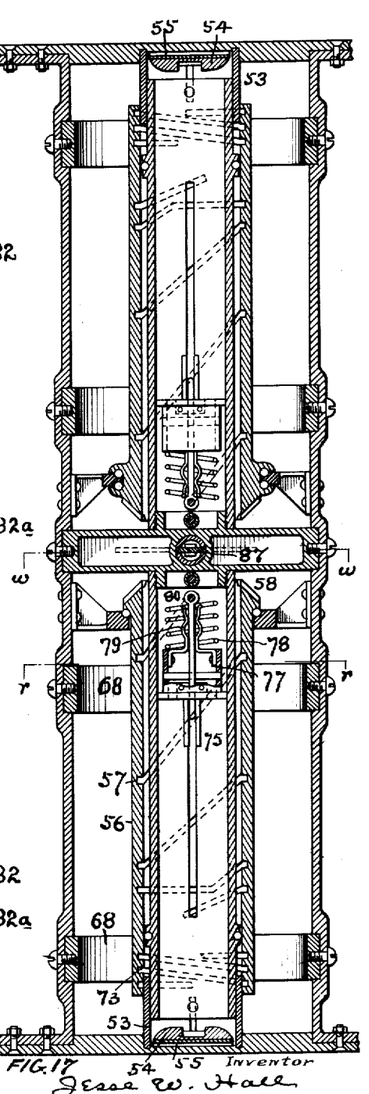
Figure 18:
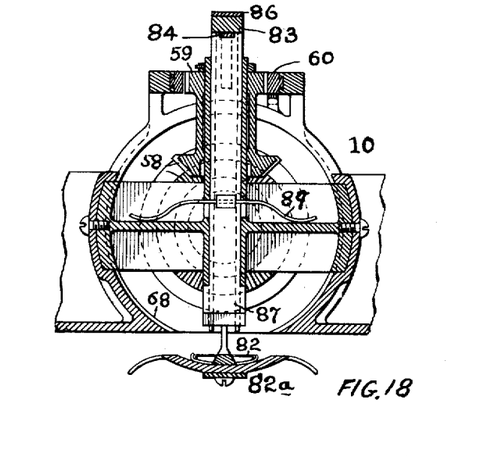
Fig. 18 is a cross section of the knot tier on line $w$—$w$ of Fig. 17.
Figure 19:
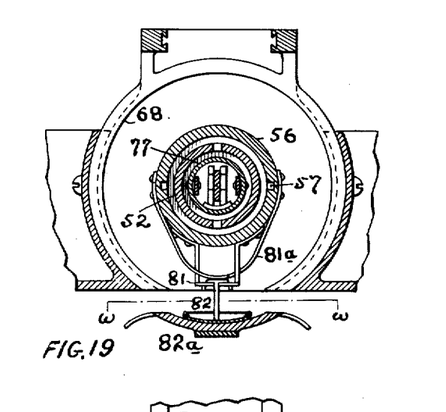
Fig. 19 is a cross section of the same on line $r$—$r$.
Figure 20:
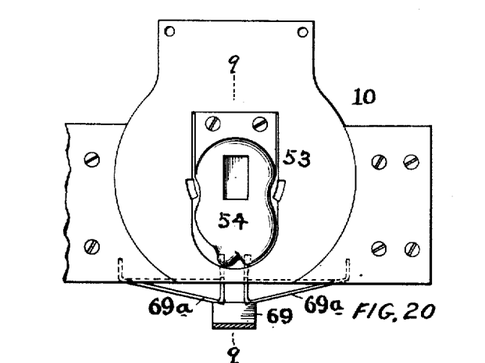
Fig. 20 is an end view of a knot tier.
Figure 21:
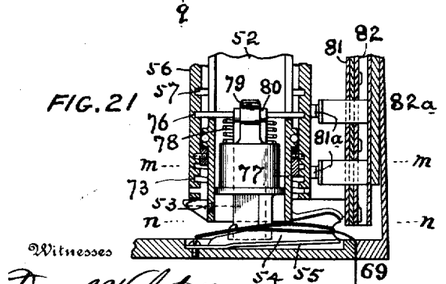
Fig. 21 is a sectional elevation on line $q$—$q$ of Fig. 20.
Figure 22:
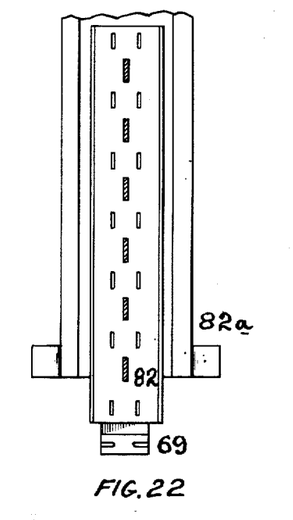
Fig. 22 is a sectional elevation of a part of the knot tier on line $w$—$w$ of Fig. 19.

Referring more particularly to the knot tying devices and which are especially illustrated in Figs. 16 to 22, the construction and operation will be understood by the following explanations. As before stated, this knot tier is designed to tie two knots upon the cords, the said cords being subsequently severed between the knots to free the bundle from the ends of the two cords which lead to the bobbins and are left in a condition tied together, as indicated in Fig. 1. The knot tying devices proper for tying each of the knots is the same, but are inverted relatively to each other and hence it will suffice to describe one of them. A fixed tubular stem 52 is provided with an adjustable head 53 about which the cord is wrapped and this head is provided with a pivoted jaw 54 grooved upon its outer edge and spring pressed against the head by a spring 55 (Fig. 16). This tubular stem 52 is arranged within a rotatable cam cylinder 56 having cam grooves 57 and adapted to be rotated by bevel gears 58 one of which is driven by a pinion 59 by means of a rack bar 60, the latter being connected to a cross bar 61 by a spring 62 the cross bar being carried by brackets 61ᵇ in vertical guides 61ª and is vertically reciprocated by worms 64 journaled between bearings 65 on the vertically adjustable frame 6 and driven by means of vertical shafts 66 having a slidable splined connection with the worms. These splined shafts are driven by means of pinions 67 meshing with gears 16ᵇ, the latter having secondary gears 16ᶠ which receive rotary motion from a sliding frame 17ᵇ operated by means of a cam 102 on the cam shaft 72, hereinbefore referred to. The head 53 has a sliding connection with the tubular stem 52 and is reciprocated upon it by means of the cam 73, in the cam cylinder operating upon it through the pins 74. 75 is a vertically reciprocating looper and has a transverse pin 76 which operates in the cam groove 57 of the cam cylinder, so that when the cylinder is rotated, the looper 75 and the looper head 53 move in opposite directions and with definite movements, the object being for the looper to draw the cords through the loop carried by the head in tying the knot. The looper is connected to a frame 77 which is guided upon the part having the cross pin and is provided with a spring 78 for normally moving it into open position as indicated in Fig. 16. This frame 77 is also provided with spring jaws 79 which coöperate with the hub 80 of the cross pin, so as to hold the looper 75 in a closed position upon the looper frame 77 when it grasps the cords preliminary to drawing them through the loop. When the cords are delivered to the knot tier from the cord guides, they take a vertical position from the bundle upward and lie between the cord clamps indicated by the parts 81 and 82 the latter comprising a head 82ª which is carried by a central bar 83 and moved backward (to clamp the cords) by the action of a cam 84 on a vertically reciprocating bar 85 secured to and moving with the cross bar 61. A spring 86 normally holds the head 82ª of the cord holder in open position, and springs 81ª operate to hold the part 81 of the cord holder in open position. 87 is a cutter which is arranged between the two knot tiers and co-operates with the movable jaw of the cord holder to sever the cords between the two knot tiers proper. This cutter is moved into cutting position by means of the cam face 88 on the bar 85 and is spring pressed out of cutting position when released by the cam by means of a spring 89 (Fig. 18). 68 are fixed circular guides within which the cam cylinder and cord holder parts are journaled and caused to rotate while holding the cord holder or clamps in closed and clamping position. These guides 68 are open at the front so that the cords and part 82 of the cord clamp may enter preliminary to the rotation thereof. When the cords are clamped between the cord clamps 81 and 82 they are also clamped by the jaw 69 on the head 82ª and located between the spring fingers 69ª (Fig. 20), and fixedly held between one knot tying mechanism and the bundle on the one hand and the other knot tying mechanism and the cord guides on the other hand. When the cord clamps 81 and 82, together with the cam cylinder 56 are rotated the cord ends held by the said clamps is wrapped about the looper heads on the ends of the fixed tubular stems 52.

Figures 23, 24, 25:
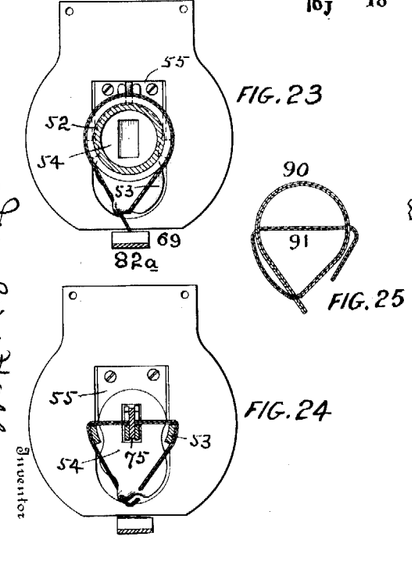
Fig. 23 is a cross section of part of the knot tier on line $m$—$m$ of Fig. 21.
Fig. 24 is a similar section of the knot tier on line $n$—$n$ of Fig. 21.
Fig. 25 is a general view showing the arrangements of the cords when manipulated by the knot tier in tying the knot.
Figures 26, 27:
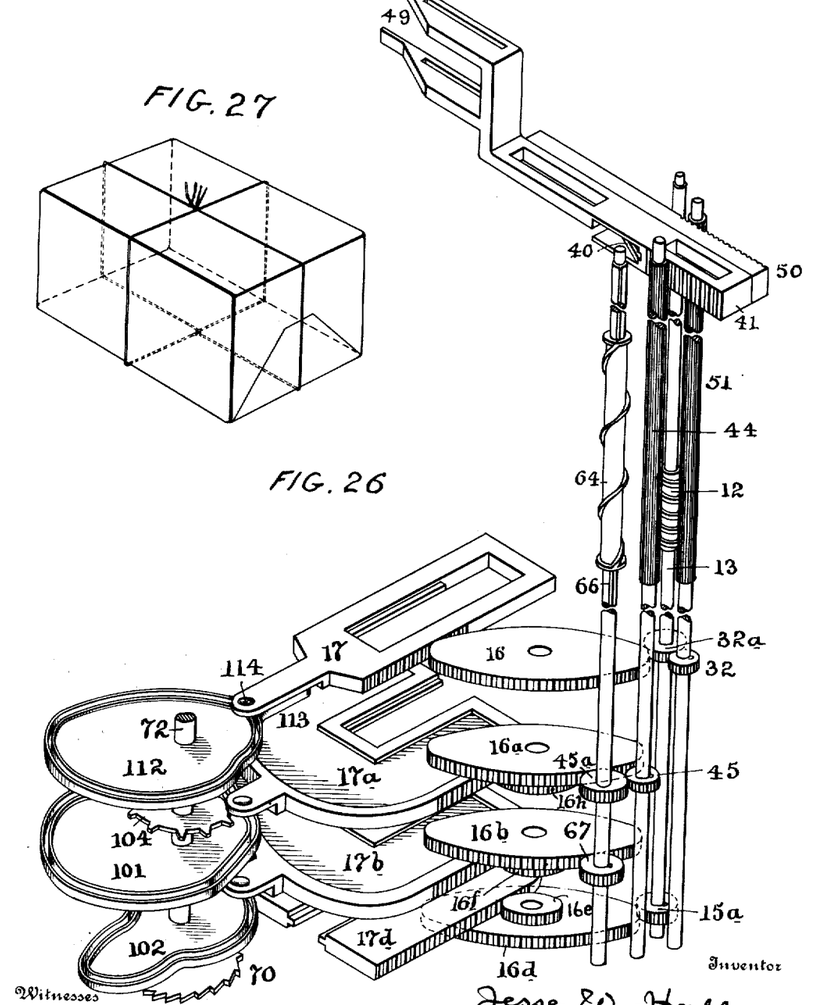
Fig. 26 is a diagrammatic perspective view of the gearing and cams in the base of the machine and Fig. 27 is a perspective view of a bundle tied by use of my invention.

The general operation of the knot tier is as follows: When the cords have been introduced between the cord holders by bringing the cord guides together and then upward to the position indicated in Fig. 3, the worms 64 are caused to be rotated by the means heretofore described and this action causes the cross bar 61 to descend. When the cross bar 61 descends, the first action is to clamp the cords, next to cut them between the knotters, and then to wrap the cords about the looper heads. This last action is delayed by the spring 62 holding the rack bar 60 stationary until the clamping and severing operations are completed. After the cords are wrapped around the looper head giving the loop 90 (Fig. 25), the looper head is moved toward the tubular stem, opening the jaw 54 so as to permit the cords to pass between the head and jaw and take the position indicated at 91 (Fig. 25), immediately in line with the diameter of the tubular stem. Simultaneously with this action, the looper 75 is caused to descend so that it is in position to receive the cord when brought into the diametrical position referred to, and, upon a further movement, said looper closes upon the cords and holds them and at the same time the cutter cuts the cords between the two knots being thus formed. When this is accomplished, the spring jaws 79 of the looper have been pressed upward so as to engage the hub and hold the looper closed on the cords. The operation is now reversed and by raising the cross bar 61 the cam cylinder is oppositely rotated, thereby simultaneously returning the looper head and looper to their original positions (Fig. 16), and drawing the ends of the cord through the loop on the head and forming a knot.

The general construction of the knot tier is immaterial to my invention beyond the fact that, it has the double construction equivalent to two knot tiers arranged at a distance apart, so as to tie a knot close to the bundle which may be removed with the bundle, and a second knot at a distance from the bundle to unite the ends of the cords leading from the two cord guides; therefore, while I have described my preferred form of knot tiers, I do not limit myself to any particular construction of knot tier, as any suitable knot tier, heretofore known and in use, may be adapted for the purposes of my invention and be combined with the remaining parts of the apparatus to accomplish the results hereinbefore specified.

Figures 11, 12, 13, 14, 15:
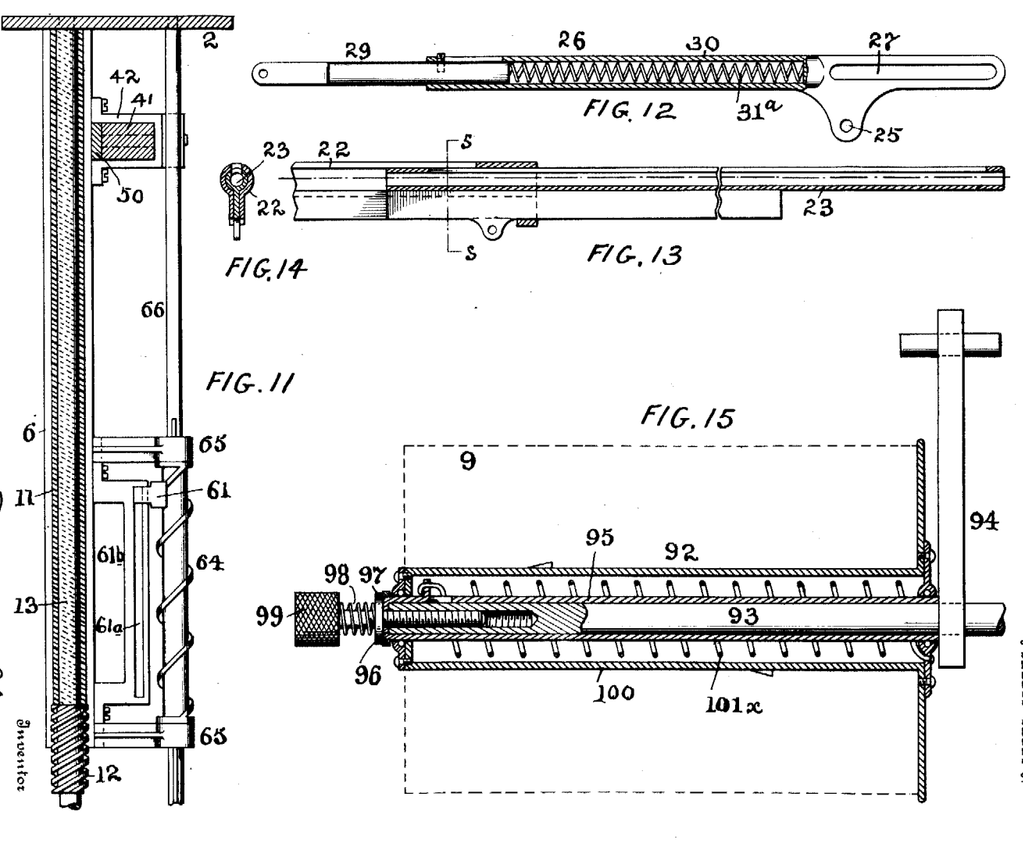
Fig. 11 is a sectional elevation of Fig. 5 on line $t$—$t$.
Figs. 12 and 13 are sectional elevations of details of the cord guiding devices.
Fig. 14 is a cross section of Fig. 13 on line $s$—$s$.
Fig. 15 is a sectional elevation of one of the cord bobbin holders.

The cords which are delivered to the cord guides extend downward from two spools 92 which may have the construction shown in Fig. 15. A shaft 93 may be carried by a frame 94 hinged to the main frame of the machine, so as to be swung out in applying the cord balls or bobbins. Upon the shaft 93 is a tubular sleeve 95 having an inwardly directed flange 96 which is clamped against the end of the shaft 93 by a friction washer 97 inwardly pressed by a coil spring 98 whose tension is regulated by a screw 99 screwed into the end of the said shaft 93. By this means the sleeve is permitted to rotate with a frictional resistance. Journaled upon the sleeve is a spool 100 upon which the cord ball or bobbin is slipped. A coil spring 101$^x$ surrounds the sleeve and has one end connected to the spool and the other end to the sleeve. It will now be understood, that a pull upon the cord will cause both the spool and the sleeve to rotate with the coil spring 101$^x$ in more or less coiled condition and under tension. The amount of tension is governed by the amount of friction between the sleeve and the shaft and this may be adjusted. If the cords should have a tendency to become slack by the action of the cord guides, the surplus cord is rewound upon the spool, so that the cords are kept normally under tension at all times. Any other means for controlling and delivering the cords to the cord guides may be employed in lieu of those shown.

Referring now to the general operation of the apparatus, the frame 6 is elevated to its highest position and the cord guides 8 are normally in the position shown in Fig. 1, leaving a clear space below the frame 6 for the manipulation of the bundle. The united cords from the two cord guides are drawn down and connected with the retaining hooks 115. The bundle is then placed over the horizontal cord C, and either of the hand levers 118 are rocked to rotate the retaining hooks 115 and liberate the cord so that it bends up close to the bundle.

Figure 2:
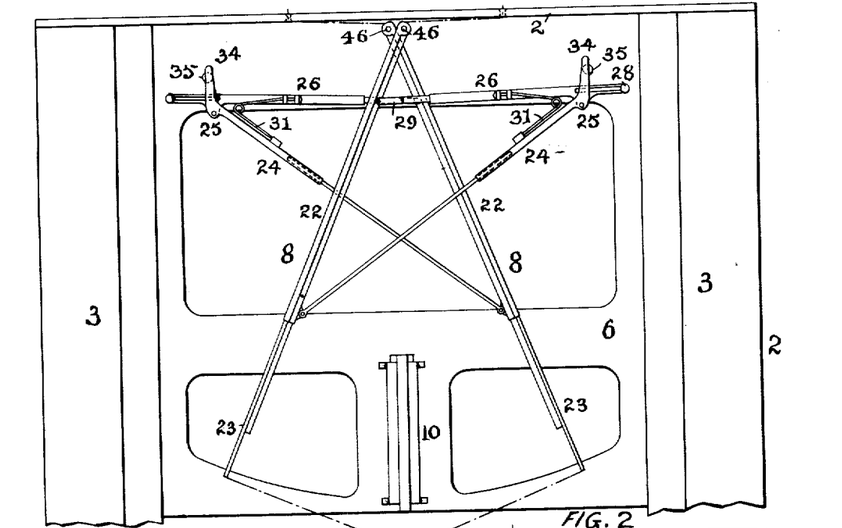
Figs. 2 and 3 are similar elevations of portions of the same showing parts of Fig. 1 in different adjustments.

The rock shaft 18 is operated by the handles 20 and, through the racks and gearing, operates the reciprocating rack bar 50 for causing the cord guides to cross, as indicated in Fig. 2, so that the cords are wrapped completely around the bundle. The bundle may now be manipulated to lock the crossing cords and the cord guides allowed to return to their original position indicated in Fig. 1. The bundle may be manipulated so as to bring the cords leading from the cord guides to the under part of the bundle and then, once again, the rock shaft may be manipulated to again bind the bundle. These operations may be repeated as often as desired and the cord guides always return to their original position, indicated in Fig. 1. When the proper amount of cord is wrapped around the bundle, the lever 109 is pulled and this gives to the cam shaft 72 a partial rotation which, by means of cam 101, operates the rack bars 41 and the cams 40 and 49 thereof to cause the cord guides and the radius bars to move backward from the position occupied in Fig. 5. A continuation of said reciprocation of the lever 109 causes the cam 112 to operate the rack bars 50 and these in turn cause the radius bars 26 to be shifted so as to bring the two swinging arms 22 of the cord guides into the vertical position. During this operation the arms 34 of the radius bars 24 strike the studs 35 and draw the tubular cord guides 23 upward into the position shown in Fig. 3. During this operation of the cord guides the cords are drawn into the knot tier from each side and in position to be clamped by the clamping devices thereof. A further manipulation of the lever 109 gives a further movement to the cam shaft 72 and the effect of this is to bring the knot tier into operation by means of the cam 102 and during the time of the operation of the knot tier the parts previously operated remain stationary and in the condition indicated in Fig. 3. When the knots are completed, the cam shaft 72 will have made two-thirds of a revolution, at which time the knot tier will have not only completed the knots but reset itself to its original condition illustrated in Figs. 16 and 17 and the bundle will have been liberated in tied condition. At this time the cord ends from the cord guides are left tied together and freed from the knot tier. A further movement of the lever 109 will complete the revolution of the cam shaft and will spread the cord guides into the original condition illustrated in Fig. 1, so as to be ready for tying a new bundle.

Preliminary to the actual tying of the knots, the lever 16$^g$ is operated for the purpose of lowering the frame 6 carrying the knot tier 10 down upon the bundle so that when the knots are tied one of them is tied close to the bundle to avoid any undesirable slack in the binding cords. This movement of the lever 16$^g$ should take place in practice before the second movement of the lever 109 and which puts the knot tier into operation to tie the knots. During the tying of the knots, both the lever 16$^g$ and the lever 109 will be held by the hand, the former being first drawn back and held while the latter is being operated. After the tying of the knots, both levers are liberated, allowing the frame 6 to ascend to its upward limit and the bundle to be removed.

Instead of preparing the machine to receive the bundle by looping the cord C under the hooks 115, the frame 6 may be moved down until the cords snap under the hooks which retains them when the frame 6 is again raised preliminary to the bundle tying operation.

I have described my invention in the form which is suitable for general use, and while I prefer the same, I do not restrict myself to the details thereof as these may be modified in various ways without departing from the spirit of the invention.

Having now described my invention what I claim as new and desire to secure by Letters Patent, is:

1. In a bundle tying machine, the combination of cord guides for crossing two cords around a bundle, and a knot tier having means for tying the cords together close to the bundle.

2. In a bundle tying machine, the combination of cord guides for crossing two cords around a bundle, and a knot tier having means for tying the cords together close to the bundle and also at a distance from the bundle, and means for severing the cords between the two knot tying means.

3. In a bundle tying machine, the combination of cord guides for crossing the two cords around a bundle, and a knot tier having means for tying the cords together close to the bundle and also at a distance from the bundle, means for severing the cords between the two knot tying means, and hand operated devices for moving the cord guides and operating the knot tier and severing means.

4. In a bundle tying machine, the combination of a knot tier two cord guides for guiding two cords to the knot tier, and means for operating the cord guides and knot tier successively.

5. In a bundle tying machine, the combination of a knot tier, having separated devices for tying two knots at a distance apart, severing devices for cutting the cords between the separated devices for tying the knots, two cord guides for guiding two cords to the knot tier and severing devices, and means for operating the cord guides, knot tier and severing devices.

6. In a bundle tying machine, the combination of two cord supplying devices, two cord guides for guiding the cords to or from each other about the bundle, two cord knotters for tying the cords together at two separated points in their length, and severing devices for severing the cords between the two cord knotters.

7. In a bundle tying machine, the combination of two cord supplying devices, two pivoted extensible cord guides for guiding the cords to or from each other about the bundle, two cord knotters for tying the cords together at two separated points in their length, severing devices for severing the cords between the two cord knotters, and hand operating means for operating the knotters and severing devices, and cord guides.

8. In a bundle tying machine, the combination of a vertically adjustable frame, movable cord guides upon the frame for guiding and crossing two cords, a knot tier carried by the frame and having separated devices arranged to tie two knots upon the cords between the cord guides and bundle, severing devices for severing the cords between the two separated devices for tying the knots, and hand controlled means for raising or lowering the adjustable frame and operating the cord guides, knot tier and severing devices.

9. In a bundle tying machine, means for guiding the cords passing from opposite sides of the bundle to bring them together, a knot tier having separated devices to operate upon the cords when brought together to tie two separated knots upon the cords to unite them, and severing devices for severing the cords between the separated devices for tying the two knots, whereby the tied bundle is freed and the two cord ends united ready for the next bundle.

10. In a bundle tying machine, means for temporarily holding a cord whereby the bundle may be placed upon it in proper position, means for guiding the cords passing from opposite sides of the bundle to bring them together, a knot tier having separated devices to operate upon the cords when brought together to tie two separated knots upon the cords to unite them, and severing devices for severing the cords between the separated devices for tying the two knots whereby the tied bundle is freed and the two cord ends united ready for the next bundle.

11. In a bundle tying machine, means for guiding the cords passing from opposite sides of the bundle to cross them and subsequently bring them together, a knot tier having separated devices to operate upon the cords when brought together to tie two separated knots upon the cords to unite them, and severing devices for severing the cords between the separated devices for tying the two knots whereby the tied bundle is freed and the two cord ends united ready for the next bundle.

12. In a bundle tying machine, means for guiding the cords passing from opposite sides of the bundle to bring them together consisting of two swinging arms having extensible cord guiding ends, means to adjust the two swinging arms and their guiding ends to cross them or bring them together at will, a knot tier having separated devices to operate upon the cords when brought together to tie two separated knots upon the cords to unite them, and severing devices for severing the cords between the separated devices for tying the two knots, whereby the tied bundle is freed and the two cord ends united ready for the next bundle.

13. In a bundle tying machine, the combination of means to guide cords about a bundle and cross them, clamps for holding the cords close to the bundle, two knotters for tying two knots upon the cords close to the clamps, means for severing the cords between the knotters, and hand controlled devices for operating the said several parts of the bundle tying machine.

14. In a bundle tying machine, the combination of means to guide cords about a bundle and cross them, spring actuated take up spools for carrying the cords for the cord guiding means and for taking up all slack therein, clamps for holding the cords close to the bundle, two knotters for tying two knots upon the cords close to the clamps, means for severing the cords between the knotters, and hand controlled devices for operating the said several parts of the bundle tying machine.

15. In a bundle tying machine, the combination of knot tying devices for tying two knots at one time, with two pivoted cord guides provided with extensible tubular ends, means for swinging the two cord guides to and from the knot tying devices respectively from opposite sides thereof, means for causing said cord guides to cross in front of the knot tying devices to cross the cords and means to sever the cords at a place which comes between the two knots, and hand operated means for timing the operation of the several above specified elements.

16. In a bundle tying machine, the combination of means for guiding two connected cords upon a bundle in binding it, means for clamping the cords leading from the bundle close together, means for severing the clamped cords, and means for tying knots upon the cords at each side of the severing means, whereby the tied bundle is freed and the ends of the two cords leading from the guiding means are united.

17. In a bundle tying machine, the combination of a tying table, two adjustable cord guides for guiding connected cords, means for temporarily holding the cords across the tying table, a knot-tier having two knot tying devices at a distance apart, and means to move the cord guides to and from the knot-tier and to deliver the cords to the two knot-tying devices.

18. In a bundle tying machine, the combination of a tying table, two adjustable cord guides for guiding connected cords, means for temporarily holding the cords across the tying table, a knot-tier having two knot-tying devices at a distance apart, and means for causing the cord guides to cross each other and the knot tier to cross the cords on the bundle and also to move the cord guides to and from the knot-tier and to deliver the cords to the two knot-tying devices.

19. In a bundle tying machine, the combination of a tying table, two adjustable cord guides for guiding connected cords, means for temporarily holding the cords across the tying table, a knot-tier having two knot-tying devices at a distance apart, means to adjust the knot tying device and cord guides to and from the tying table, and means to move the cord guides to and from the knot tier and to deliver the cords to the two knot-tying devices.

20. In a bundle tying machine, the combination of means for guiding a cord around a bundle, clamping devices for holding the two cord ends leading from the bundle to the cord guiding means parallel to each other, two knot tiers for tying knots in the cord ends at short distances apart in their length, and means to sever the cords between the knot-tiers, whereby one knot may be tied close to the bundle and the other knot tied between the cord ends leading from each of the cord guiding means.

21. In a bundle tying device, the combination of means for guiding a cord around a bundle, clamping devices for holding the two cord ends leading from the bundle to the cord guiding means parallel to each other, two knot-tiers for tying knots in the cord ends at short distances apart in their lengths, means to sever the cord ends between the knot-tiers, whereby one knot may be tied close to the bundle and the other knot tied between the cord ends leading from each of the cord guiding means, a support for the bundle, and means for causing a relative movement between the knot-tiers and the support for the bundle.

22. In a machine for tying bundles, the combination of a knot-tier for tying together two cord ends, means for guiding the united cord ends around the bundle, means for tying the cords which extend between the bundle and cord guides close to the bundle, and at the same time tying the said cord ends again at a distance from the bundle, means for severing the cords to free the bound bundle, and hand operated devices for operating the several parts above specified at the will of the operator.

23. In a bundle tying machine, a cord guide for controlling the cord consisting of a swinging arm 8 having an extensible tubular cord guide 23, and connecting spring actuated radius bars jointed together at one end and connected at their other ends respectively with the swinging arm 8 and the tubular guide 23.

24. In a bundle tying machine, a cord guide for controlling the cord consisting of a swinging arm 8 having an extensible tubular cord guide 23, and connecting spring actuated radius bars jointed together at one end and connected at their other ends respectively with the swinging arm 8 and the tubular guide 23, means for reciprocating one of the radius bars to produce a swinging motion to the cord guide; and means operating upon the other radius bar for moving the tubular cord guides upon the swinging arm for shortening the cord guide as a whole.

25. In a bundle tying machine, a cord guide for controlling the cord consisting of a swinging arm 8 having an extensible tubular cord guide 23, and connecting spring actuated radius bars jointed together at one end and connected at their other ends respectively with the swinging arm 8 and the tubular guide 23, means for reciprocating one of the radius bars to produce a swinging motion to the cord guide; means operating upon the other radius bar for moving the tubular cord guide upon the swinging arm for shortening the cord guide as a whole, and devices for putting the last specified means into or out of operation.

26. In a bundle tying device, a bundle support, combined with a frame having a relative movement to or from the support, means carried by the frame for guiding cords about the bundle means for tying knots upon the cord, and means for severing the cord at points intermediate of those parts of the cord upon which the knots are tied.

In testimony of which invention, I have hereunto set my hand.

JESSE W. HALL.

Witnesses:
R. M. HUNTER,
R. M. KELLY.